United States Patent [19]

Iwane

[11] Patent Number: 5,349,433
[45] Date of Patent: Sep. 20, 1994

[54] AUTOMATIC LENSMETER

[75] Inventor: Toru Iwane, Yokohama, Japan

[73] Assignee: Nikon Corporation, Tokyo, Japan

[21] Appl. No.: 822,948

[22] Filed: Jan. 21, 1992

[30] Foreign Application Priority Data

Feb. 1, 1991 [JP] Japan .................................. 3-012270
Feb. 4, 1991 [JP] Japan .................................. 3-013569

[51] Int. Cl.$^5$ .............................................. G01B 9/00
[52] U.S. Cl. .................................... 356/124; 356/125; 356/127
[58] Field of Search ................................. 356/124–127

[56] References Cited

U.S. PATENT DOCUMENTS 4,730,924 3/1988 Allard et al. ........................ 356/125
4,779,979 10/1988 Iwane .................................. 356/127

Primary Examiner—Davis L. Willis
Assistant Examiner—Hoa Q. Pham
Attorney, Agent, or Firm—Shapiro and Shapiro

[57] ABSTRACT

An automatic lensmeter for automatically measuring a lens characteristic of a lens to be tested, comprises: a measuring unit including an optical system for detecting a refraction characteristic of the lens; a calculation unit for calculating a lens characteristic value in accordance with information from the measurement unit; a display unit for displaying the lens characteristic value calculated by the calculation unit; an actual eccentricity calculation unit for calculating an actual eccentricity based on the lens characteristic value calculated by the calculation unit; and an optical axis position determination unit for determining whether the actual eccentricity calculated by the actual eccentricity calculation unit is within a predetermined range or not to determine whether the measurement and/or the marking are permitted. The display unit displays the determination of the optical axis position determination unit.

5 Claims, 10 Drawing Sheets

AUTOMATIC LENSMETER

BACKGROUND OF THE INVENTION

1. Field of the Invention

The present invention relates to automatic refractive power measurement for an eyeglasses lens and a contact lens.

2. Related Background Art

In a prior art automatic lensmeter or conventional lensmeter, a lens to be tested is positioned by referencing an optical eccentricity, that is, a prism value. When the eccentricity is displayed on a screen, it is displayed by referencing the eccentricity as if it were a display for a projection type lensmeter. The sign for the completion of positioning, the positioning for the refractive power measurement and the positioning for marking the center of the lens are effected by referencing the prism value and only the results thereof are indicated to the operator. Even in a best case, the refractive power is classified to one of several levels and the reference of the discrimination is changed in accordance with the level.

In the prior art methods and apparatus, both the positioning for measurement and the positioning for marking reference the prism value.

However, the marking refers to an actual distance due to the restriction by a mechanical precision and the restriction by a machining precision. Accordingly, when the degree of the lens is low, the positioning precision is low, and when the degree is high, the positioning precision is high and the positioning is difficult to attain. That is, the positioning is easy or difficult depending on the refractive power of the lens to be tested.

For example, when the refractive power of the lens is high, the positioning is very hard to attain and a target moves off the screen by slightly moving the lens. Thus, it is difficult to position the lens while watching the display.

When a mixed astigmatism lens (which has a larger cylindrics than a spherics with opposite polarities, such as a lens having a spherics 3DP and a cylindrics −4DP) is measured, the target may move vertically while the lens is moved horizontally. In such a case, it is very difficult to position the lens while watching the display.

In a prior art apparatus which produces a sign for the completion of positioning, the completion is determined by the prism value. As a result, the positioning for marking must be effected with a higher precision than that actually required. This is a heavy burden to the operator in the lens positioning operation.

A progressive focal length lens has recently been taking the place of a bi-focal length lens as an eyeglasses lens for an aged person. However, the lensmeter does not necessarily comply therewith.

Unlike a conventional eyeglasses lens, the progressive focal length lens has a specially curved plane other than a spherical plane or a cylindrical plane. As shown in FIG. 11, a refractive power is substantially constant in a distance area 211 which occupies an upper half of the lens but it varies from point to point in a close area 212. The close area 212 consists of an optically effective, narrow band-shaped area called a progressive area in which the refractive power progressively increases from the top down as viewed in FIG. 11 and a non-effective area (non-optical area) 213 surrounding the progressive area. The difference therebetween cannot be distinguished at a glance. Accordingly, the refractive power in the distance area can be relatively easily measured but the refractive power in the close area 212 is not easy to measure. The lens includes a wide non-effective area in which focusing is not attained by a manual lensmeter. Even by an automatic lensmeter, the measurement is not attained unless a measuring light is precisely directed to the progressive area because the diameters of the progressive area and the measuring light beam are of the same order.

As described above, the progressive focal length lens has the specially curved plane and has no uniform refractive power. Accordingly, by the prior art lens alignment which references the optical eccentricity, it is very difficult to specify the position. Actually, it is almost impossible.

SUMMARY OF THE INVENTION

It is an object of the present invention to provide a lensmeter which permits easy positioning of a lens.

It is another object of the present invention to provide an apparatus which facilitates the measurement of a progressive area of a progressive focal length lens and the alignment thereof.

In accordance with the present invention, the lensmeter comprises a measurement system including an optical system for detecting refractive powers of a lens and eccentricity thereof, and an arithmetic operation unit for calculating a sphere refractive power, a cylinder refractive power, a cylinder axis and a prism value based on the measurements, and a two-dimension display device which reflects a real eccentricity and a position thereof and repeatedly displays them on real time basis.

The two-dimension display device has a size and a resolution power to reproduce the actual movement of the lens with a magnification of unity to several times. It can display a target which indicates the center of the lens. An element for indicating the positioning of an optical axis for the measurement or the marking is also provided, although it may share the display device.

The arithmetic operation unit stores a program to carry out the arithmetic operations to be described later, and calculates the actual distance of the lens.

The present invention is carried out in the following sequence. When a lens is mounted on a measurement table, the apparatus measures it and the measurement system and the arithmetic operation unit calculate the spherics, the cylindrics, the cylinder axis and the prism value. The position calculation unit calculates the actual eccentricity of the lens based on those values. It is a vector calculation and a horizontal eccentricity and a vertical eccentricity are calculated in parallel. Those two variables are converted to the numbers of dots of the display device and the target is moved to that position. Based on the two eccentricities and the prism value, it is determined whether the position of the optical axis is sufficient for the marking or not (that is, whether the requirements of JIS or DIN are met or not) and whether they are sufficient for the measurement or not (that is, whether the distortion or the aberration complies with a specific condition of the machine or not), and they are displayed.

By continuously executing the series of steps at a speed of several steps per second or higher, the actual position of the lens can be displayed on the display screen and the completion of the positioning of the optical axis can be indicated on real time basis.

The present invention, comprises a collimator including a light source for projecting a plurality of collimated light beams for detecting a horizontal refractive power to the lens, and an optical system for directing the light beams refracted by the lens to a photo-sensing unit. In addition to the photo-sensing unit for converting the light beam to an electrical signal, the invention comprises a measurement circuit unit for amplifying and processing the electrical signal, an arithmetic operation unit for calculating refractive power data (a sphere refractive power, a cylinder refractive power, a cylinder axis and a prism value) based on the processed signals, a progressive addition and a position of the progressive area, and a memory for storing the data. It also comprises a key switch for determining a timing to store the data and a display device for displaying the progressive addition and the status of the progressive area, as an a man-machine interface element.

In the present invention, a lens refractive power signal produced by the above-mentioned measurement system is converted to a degree of sphere, a vertical refractive power and a horizontal refractive power by the arithmetic operation unit. In order to analyze the progressive area, a distance area signal is stored in the memory as background of the progressive area when the distance area is determined. It is subsequently pulled in from the data as an offset when the progressive area is analyzed.

After the distance area data has been stored, the distance area data is pulled in from the generated data for use as basic data for the progressive area refractive power.

Since the refractive power in the progressive area linearly increases along a predetermined direction, if the lens is mounted such that the progressive area extends longitudinally, the longitudinal light beam creates different refractive powers (Da, Db) between an upper portion (a) and a lower portion (b), as shown in FIG. 12. On the other hand, there is no difference in a lateral refractive power between a left portion and a right portion, and it represents a correct addition (D1-D0) of the position. However, since the longitudinal refractive power varies linearly, a mean value of the two is equal to the horizontal refractive power.

By the comparison of the prism value or the light eccentricity by only the longitudinal light beam and that by the lateral light beam, it is seen that the degree of progression of the progressive area, that is, the increase of diopter per unit distance creates the difference between the two prisms. Two-dimensionally, the degree of progression including the direction of progression is represented by a vector amount. In a conventional lens, those two prisms are equal.

Those conditions, that is, the equality of the longitudinal mean value and the lateral refractive power and whether the direction of the progressive area and the amount of progression are within the progressive area or not are criteria for decision. Other conditions may be that the lens has only the degree of sphere which is a general property of the addition lens, and it has only the positive degree.

The refractive power data is analyzed with those conditions to determine whether the lens is in the progressive area or not, the degree of progressive area, the direction thereof and the addition thereof. The resulting decisions and measurements are sent to the display device which displays them in an easy-to-recognize form. The series of steps are carried out several cycles per second repeatedly until the progressive analysis mode is terminated. In this manner, the operator can determine the position and the property of the progressive area on real time basis so that the positioning is readily attained.

BRIEF DESCRIPTION OF THE DRAWINGS

FIGS. 14A and 14B illustrate the analysis of the progressive area, in which FIG. 14A illustrates it when only a degree of sphere is included and FIG. 14B illustrates it when a progressive addition is included.

DETAILED DESCRIPTION OF THE PREFERRED EMBODIMENTS

The preferred embodiments of the present invention are now explained in detail.

Figure 1:
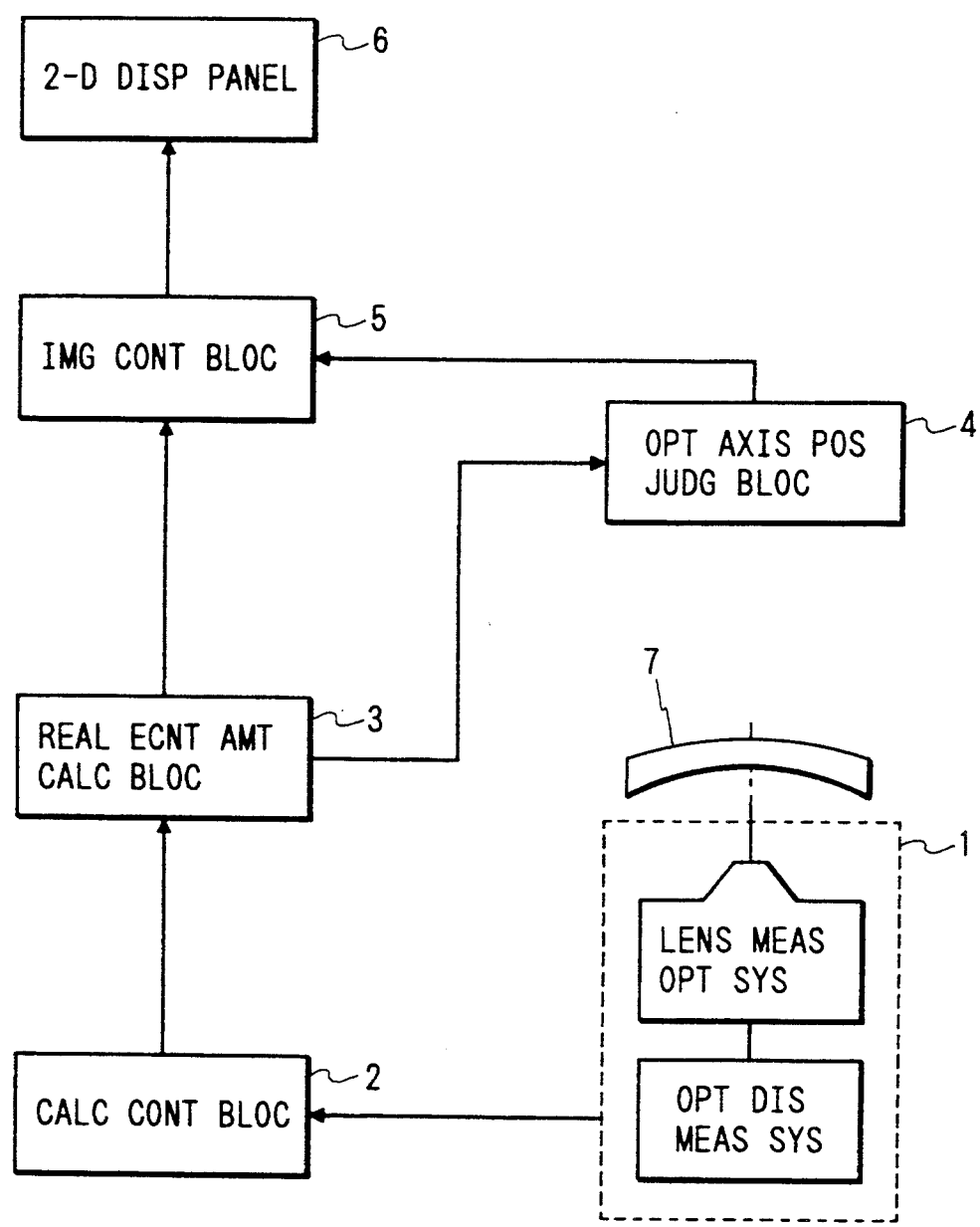
FIG. 1 shows a block diagram of one embodiment of the present invention.
Figure 5:
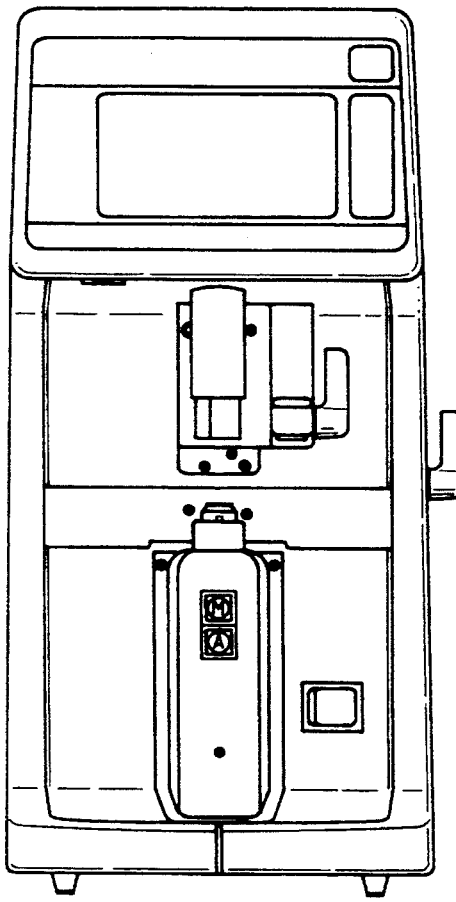
FIG. 5 shows a front view of the exterior of the apparatus.
Figure 6:
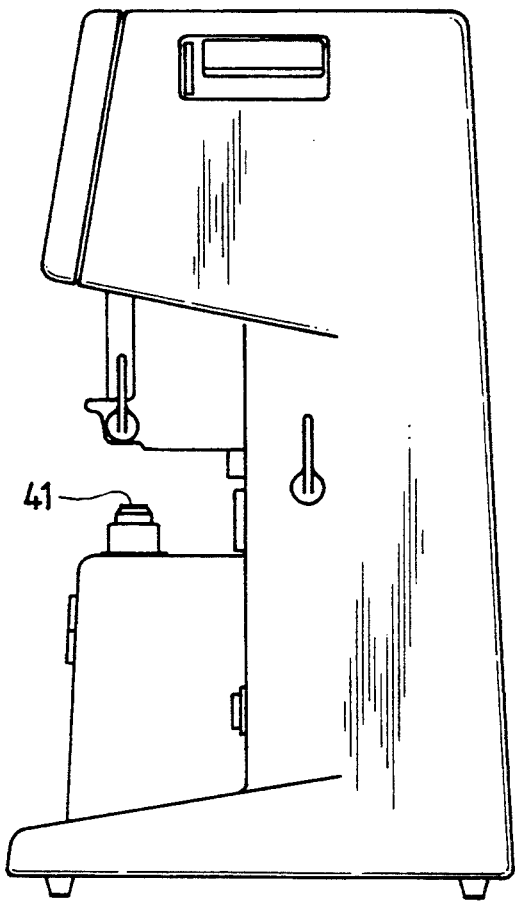
FIG. 6 shows a right side view of the exterior of the apparatus.

FIG. 1 shows a block diagram of one embodiment of the present invention, and FIGS. 5 and 6 show external views of the apparatus. FIG. 5 shows a front view and FIG. 6 shows a right side view. An operator mounts a lens 7 to be tested on a lens table 41 and detects the current lens position by a liquid crystal panel which is a display device.

Figure 2:
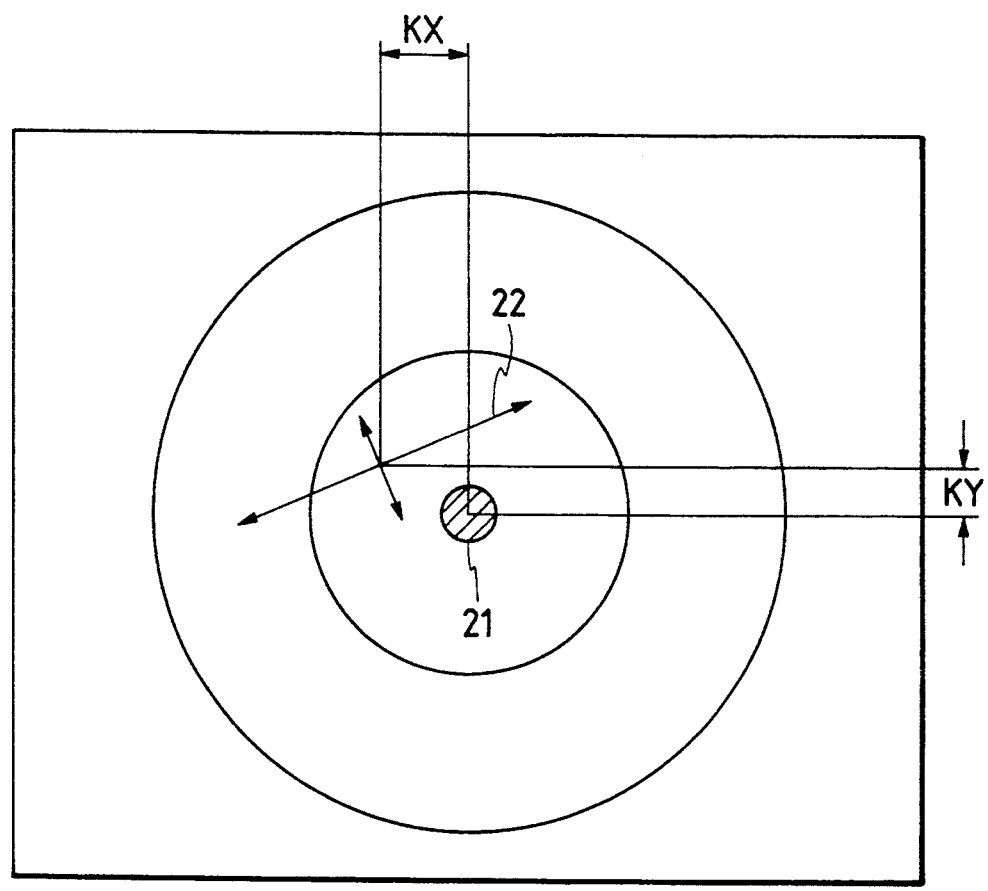
FIG. 2 shows an example of display form.
Figure 3A:
FIGS. 3A–3D show another example of display form.
Figure 3B:
Figure 3C:
Figure 3D:
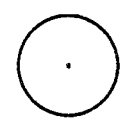
Figure 4:
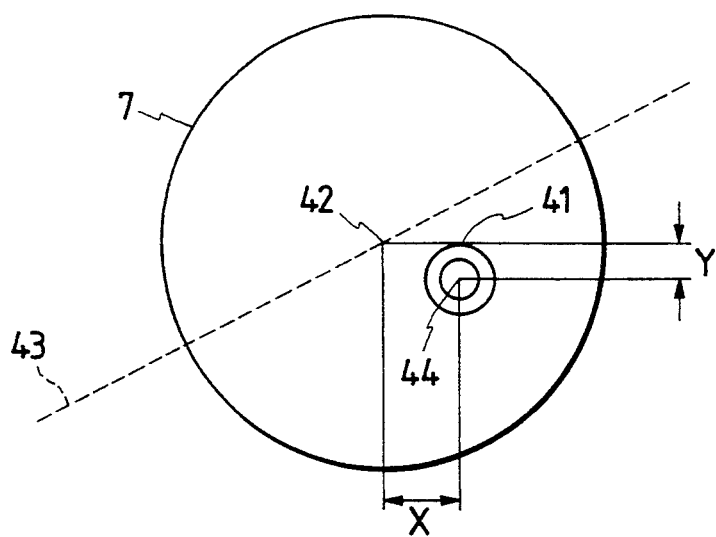
FIG. 4 shows a plan view of a lens 7 to be tested mounted on a lens measurement table 41.

FIG. 2 shows an example of display form when the lens 7 to be tested is mounted on the lens table 41 as shown in FIG. 4. FIGS. 3A–3D show examples of display forms of a center mark 21. They indicate measurement ready, marking ready, measurement and marking ready, and optical axis misalignment, from left to right. Numeral 22 denotes a target mark, numeral 42 (FIG. 4) denotes a lens center, numeral 43 denotes a cylinder axis and numeral 44 denotes an optical axis of a measurement unit. When the lens 7 to be tested is mounted on the lens table 41, a signal measured by the measurement block 1 of FIG. 1 is supplied to the arithmetic operation block 2. The signal is processed by the arithmetic operation block 2 to calculate a degree of sphere (SPH), a degree of cylinder (CYL), a cylinder axis (AXS), a horizontal prism value (PX) and a vertical prism value (PY). These are known in a conventional automatic lensmeter. Based on those data, an actual eccentricity is calculated in the following process.

$$D = S(S+C) \quad (1)$$

where
S: degree of sphere
C: degree of cylinder is first calculated to determine whether the eccentricity of the lens can be calculated or not. Then $$D > 0 \quad (2)$$

is determined. Actually it is determined by $$D > \zeta \quad (3)$$

where $\zeta$ is a small value reflecting an error. If the condition is not met, more specifically, if the lens is a simple astigmatism lens, that is, a lens having a degree of share of 0 or a lens which inherently has no refractive power, that is, no fixed optical axis, the distance to the optical axis cannot be determined. The simple astigmatism lens has an optical center which linearly extends. The processing thereof will be described later. When the formula (3) is met, the eccentricity (X in a horizontal direction and Y in a vertical direction) is expressed by:

$$X = 10(PX(S+C(1-\cos(2AX))/2 - PY\sin(2AX))/(S(S+C)) \quad (4)$$

$$Y = 10(PY(S+C(1+\cos(2AX))/2 - PX\sin(2AX))/(S(S+C)) \quad (5)$$

In where AX is an angle. This manner, the eccentricity is calculated.

The positioning of the simple astigmatism lens is now explained. As described above, the simple astigmatism lens has only the linearly extending optical center and the optical center cannot be defined by a point. Thus, a closest optical center is determined. It is expressed by:
When $C > \zeta_1$ $$X = 10PX/C \quad (8)$$

$$Y = 10PY/C \quad (9)$$

The calculated eccentricity is used as a reference of the positioning. Since it represents the actual eccentricity of the lens, a position corresponding to the actual deviation is shown to the operator without regard to the degree of the lens so that the positioning of the optical axis of the lens is attained without a feeling of disintegrity.

Where both S and C are zero, the eccentricity cannot be determined and the prism value is used as the reference for the positioning.

After the calculation by the actual eccentricity calculation block, the data is supplied to the screen control block and the optical axis determination block.

The screen control block converts the data to a displacement represented by a number of dots. Where the eccentricity is displayed by movement with a magnification of unity, it converts the data to an X coordinate NX and a Y coordinate NY as follows:

$$NX = 0.3X \quad (10)$$

$$NY = 0.3Y \quad (11)$$

where the size of dot on the image screen is 0.3 mm. The target is moved to a position which is off the center by the number of dots. This is shown in FIGS. 2 and 4, where k is 1.

The data sent to the optical axis position determination block 4 is processed in the following manner to determine whether the optical axis is in alignment or not.

The optical axis position determination block 4 first determines whether the lens 7 to be tested has a refractive power or not. If $$C < \zeta_1 \text{ and } S+C < \zeta_0 \quad (12)$$

is met, it is determined that the lens has no refractive power.

When the lens has a refractive power, that is, when the formula (12) is not met, the optical axis is determined in the following manner. The optical axis position determination block 4 determines whether the prism value which represents the optical eccentricity is within a predetermined range or not, and then determines whether the actual eccentricity is within the predetermined range. The alignment of the optical axis is determined by those two conditions.

The optical eccentricity is determined by $$SQR(PX^2 + PY^2) < \epsilon_0 \quad (13)$$

$\epsilon_0$: a predetermined prism value.
The distance eccentricity is determined by $$SQR(X^2 + Y^2) < \eta_0 \quad (14)$$

When both conditions are met, the optical axis is in alignment for the marking and for the measurement. When the formula (13) is met but the formula (14) is not met, the optical axis is in sufficient alignment for the measurement but not sufficient for the marking.

When the formula (14) is met but the formula (13) is not met, the optical axis is in sufficient alignment for the marking but not sufficient for the measurement.

When both the formulas (13) and (14) are not met, the optical axis is not in alignment for any of those purposes.

Figure 9:
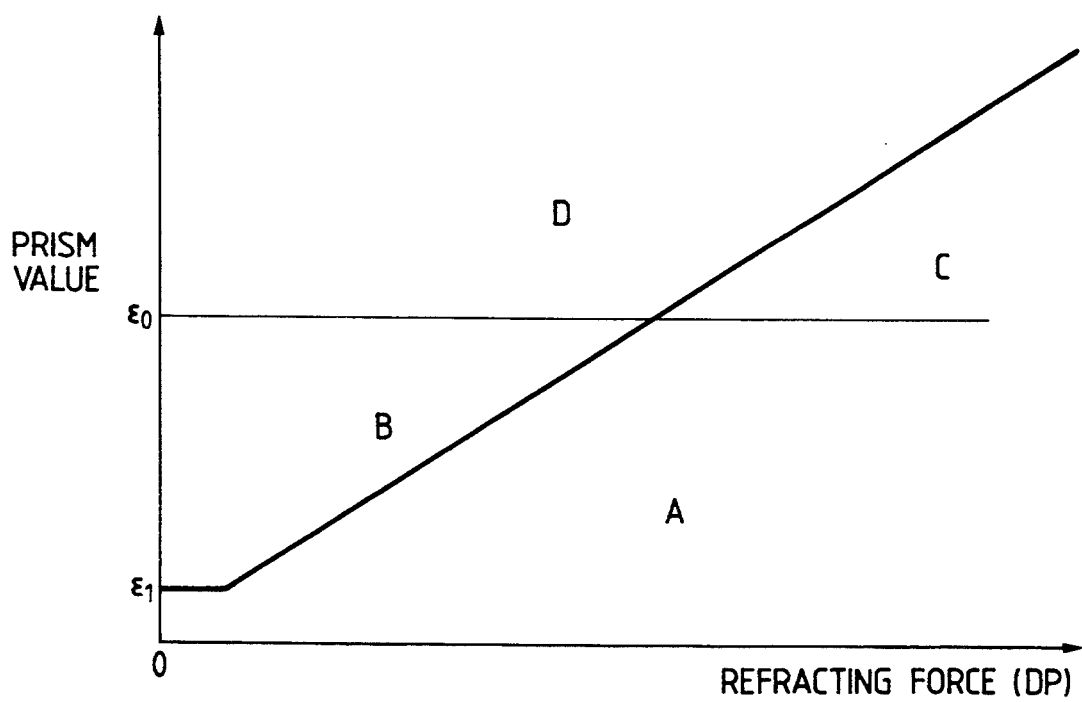
FIG. 9 illustrates a decision area of the present invention.

FIG. 9 shows the above conditions for the spherical lens.

The optical axis position determination block 4 determines that the optical axis position is in the area of A (the marking and the measurement are permitted), B (the measurement is permitted), C (the marking is permitted) or D (the optical axis is in misalignment).

When the lens has no refractive power, that is, when the formula (12) is met, the optical eccentricity is determined based on the two prism values $\epsilon_0$ and $\epsilon_1$ in order to merely keep consistency to the lens having a refractive power.

A flow of process is now explained with reference to flow charts of FIGS. 7 and 8, in which ① in FIG. 7 extends to ① in FIG. 8, and ② in FIG. 7 extends to ② in FIG. 8.

Figure 7:
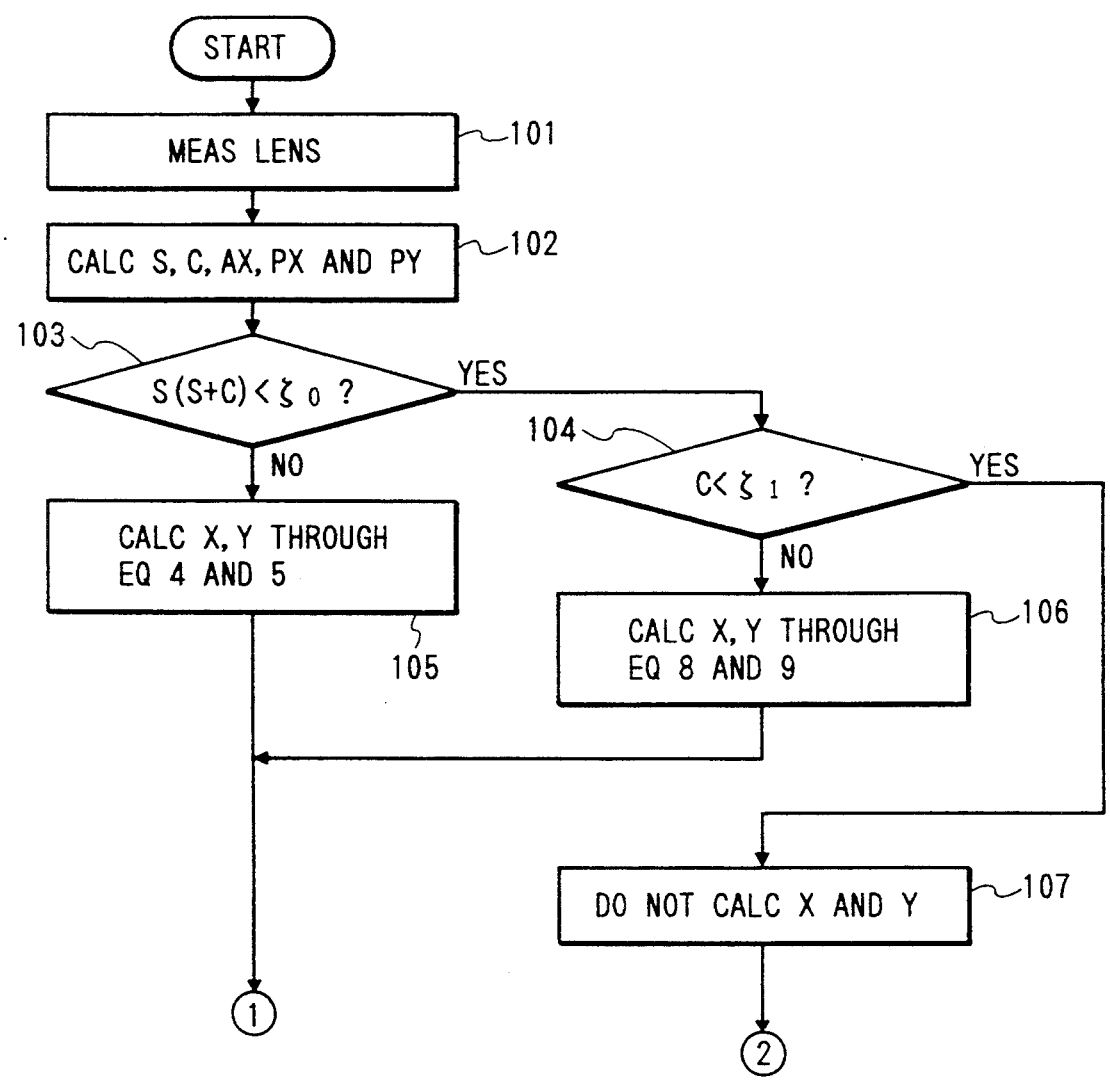
FIG. 7 shows a flow chart of a process of the present invention.

In FIG. 7, the lens to be tested is measured in a step 101, and S, C, AX, PX and PY which are basic parameters of the lensmeter are calculated in a step 102. Those steps are the same as those in a prior art automatic lensmeter. In a step 103, whether the lens meets the condition $S(S+C) < \zeta_0$ or not is determined. If the decision in the step 103 is YES, it means that the lens has no fixed one focal point. In a step 104, whether $C < \zeta_1$ is met or not is determined. If the decision in the step 103 is NO, that is, if $S(S+C)<\zeta_0$ is not met, the actual eccentricities X, Y are calculated from the formulas (4) and (5) in a step 105. The decision in the step 104, that is, whether $C<\zeta_1$ is met or not determines whether the lens has a refractive power or not. If the decision is YES, it means that the lens has no refractive power and the eccentricity cannot be calculated. Thus, the process proceeds to a step 107. If the decision is NO, the process proceeds to a step 106 to calculate the eccentricities X and Y from the formulas (8) and (9).

Figure 8:
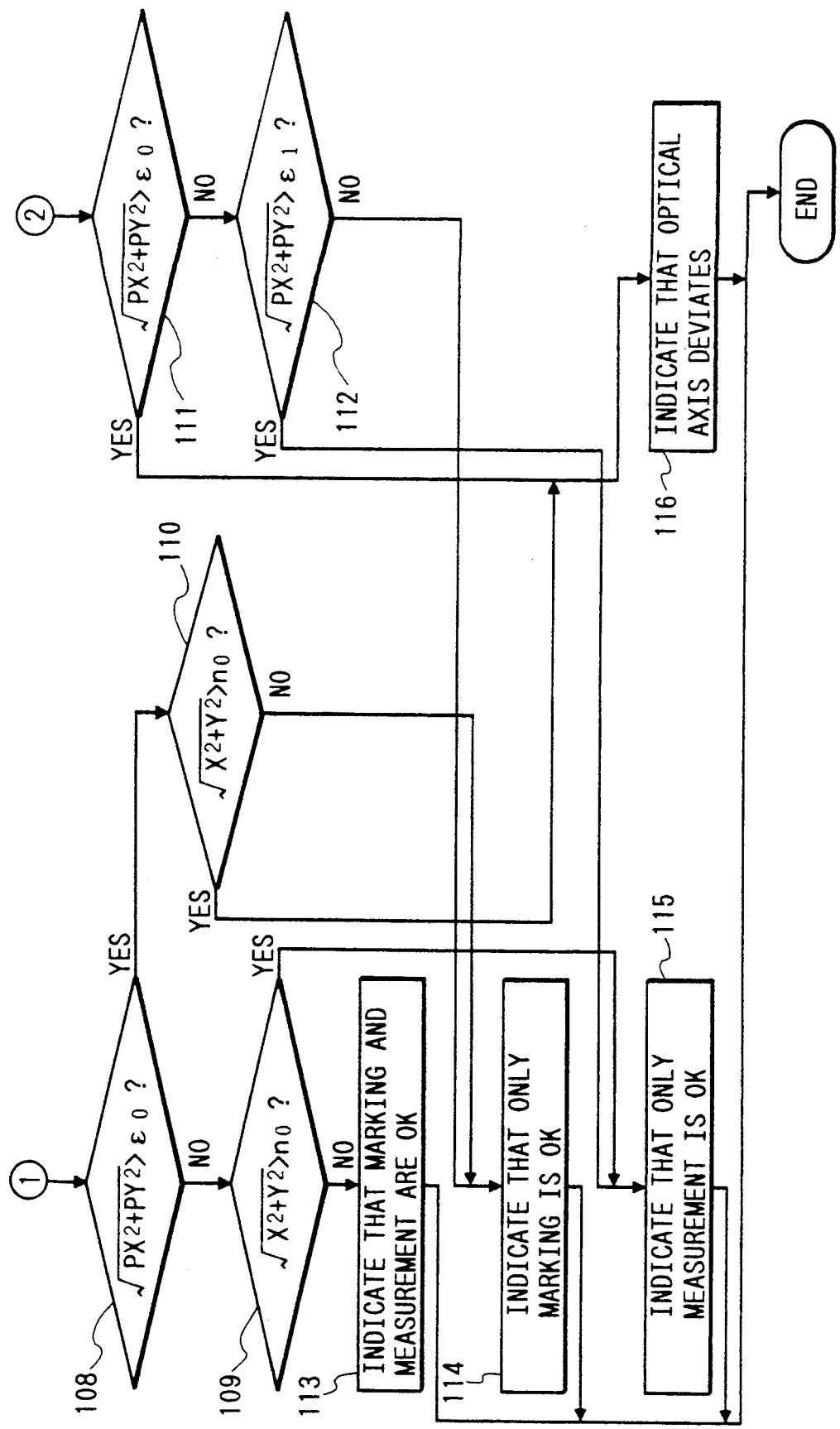
FIG. 8 shows a flow chart of another process of the present invention.

In a step 108 of FIG. 8 which extends from ②, whether the measurement is permitted or not is determined. In steps 109 and 110 whether $(X^2+Y^2)^{\frac{1}{2}}>\eta_0$ is met or not and whether the marking can be put in the predetermined area or not are determined.

$\epsilon_0$ represents a magnitude which is large enough to permit the measurement of the prism. If the measured prism is smaller than $\epsilon_0$, the measurement is permitted, and if it is larger than $\epsilon_0$, the measurement is not permitted.

For example, $\epsilon_0$ is $0.25\Delta$, where $\Delta$ is a diopter of the prism. Thus, whether $(PX^2+PY^2)^{\frac{1}{2}}>\epsilon_0$ is met or not in the step 108 determines whether the measurement is permitted or not.

$\eta_0$ represents a permissible marking range. In JIS, the marking must be put within 0.5 mm from the optical axis. Assuming that a precision of the marking machine is 0.1 mm, it is necessary to put the marking within 0.4 mm from the optical axis. In this case, $\eta_0=0.4$ mm. In the steps 109 and 110, whether the deviation from the optical axis is larger than $\eta_0$ or not is determined.

In FIG. 8, where the process extends from ②, there is no actual eccentricity and the conditions are determined based on the prism value. In a step 111, whether $(PX^2+PY^2)^{\frac{1}{2}}>\epsilon_0$ is met or not is determined as it is in the step 108. In a step 112, whether $(PX^2+PY^2)^{\frac{1}{2}}>\epsilon_1$ is met or not is determined when the refractive force of the lens is smaller than $\zeta_1$. In steps 108 and 112, $\epsilon_0>\epsilon_1$. If the refractive power of the lens is smaller than $\zeta_1$, the optical axis misalignment, that is, the eccentricity cannot be calculated. In the step 112, the prism value $\epsilon_1$ corresponding to the permissible deviation $\eta_0$ when the refractive power of the lens is $\zeta_1$ is used as the decision criterion in place of the steps 109 and 110.

$\epsilon_1$ in the step 112 is set to meet the following relationship between $\zeta_1$ in the step 104 and $\eta_0$ in the step 109.

$$\epsilon_1=\zeta_1\eta_0/10 \quad (15)$$

In this manner, the area in which the refractive power is small and the eccentricity to determine whether the marking is permitted or not cannot be calculated and the area in which the refractive power is sufficiently large continue without interruption. Assuming that the lens having the refractive power of just $\zeta_1$ is to be measured, it is not clear whether the measurement is in one area or the other depending on the measurement error. However, it is not desirable that the position to issue a sign to permit the marking varies with a higher sensitivity. This problem is solved by setting $\epsilon_1$ to meet the formula (15) because the decision for the position to issue the sign to permit the marking continuously varies.

FIG. 9 illustrates decision areas in the present invention. A border line area extending from the prism value $\epsilon_1$ close to an origin point in FIG. 9 without slope is set by the formula (15).

The resulting decision is sent to the screen control block so that a symbol is displayed at a center position on the screen. A symbol shown in FIG. 3 is displayed at the display center shown in FIG. 2. The symbols shown in FIG. 3 show measurement OK, marking OK, measurement and marking OK, and optical axis misalignment, respectively. Those symbols correspond to the areas B, C, A, D of FIG. 9, respectively.

By repeating the above sequence of steps at a speed of 2 or 3 cycles per second, the operator sees whether the target mark 22 displayed on the two-dimension display panel 6 moves with the movement of the lens. Further, whether the intended positioning of the lens has been completed or not can be instantly determined from the display on the two-dimension display panel 6.

In accordance with the present invention, the positioning of the lens which has been a time-consuming work is facilitated and an easy-to-operate automatic lensmeter is provided.

Another embodiment of the present invention is now explained in detail with reference to the drawings.

Figure 10:
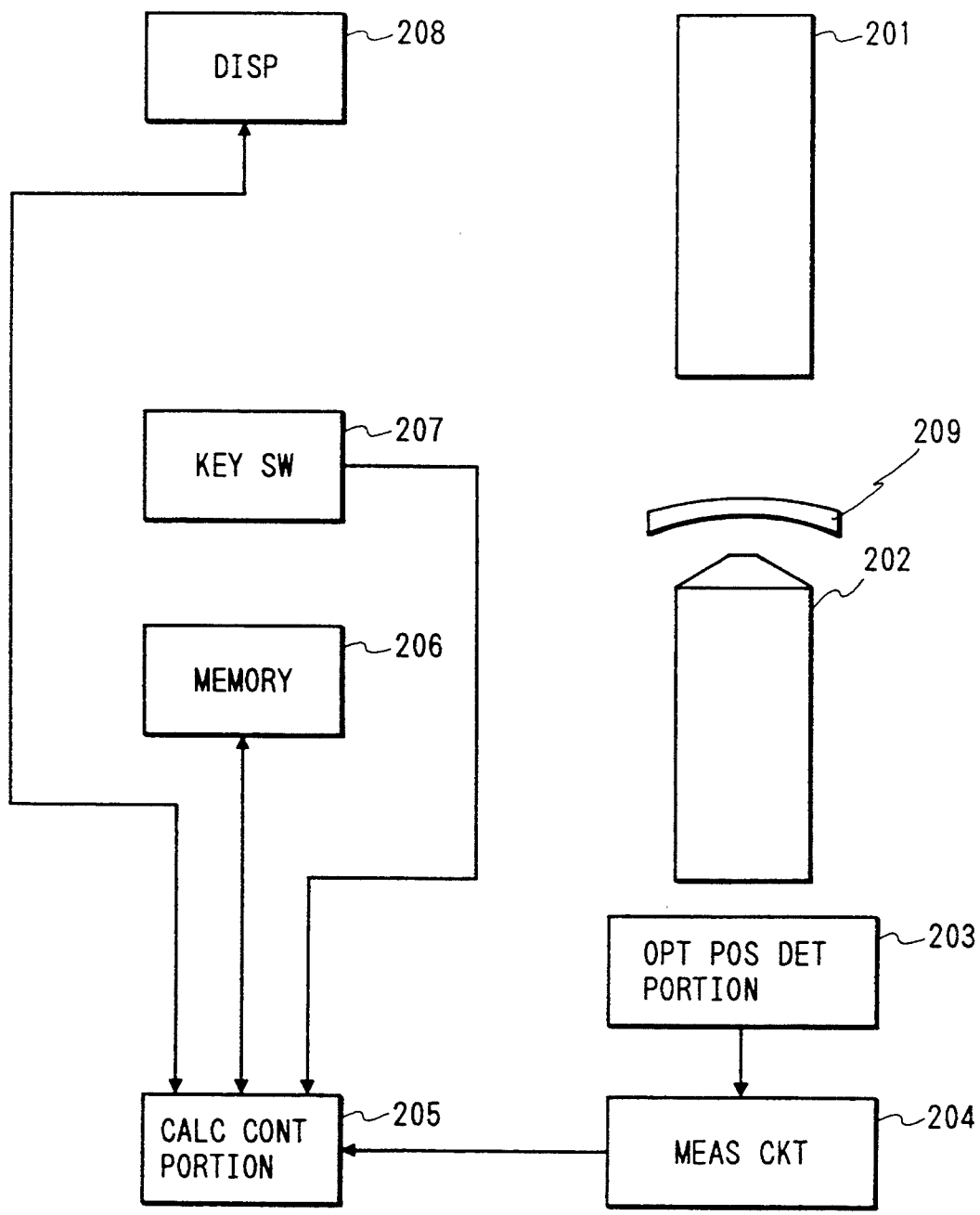
FIG. 10 shows a block diagram of another embodiment of the present invention.
Figure 11:
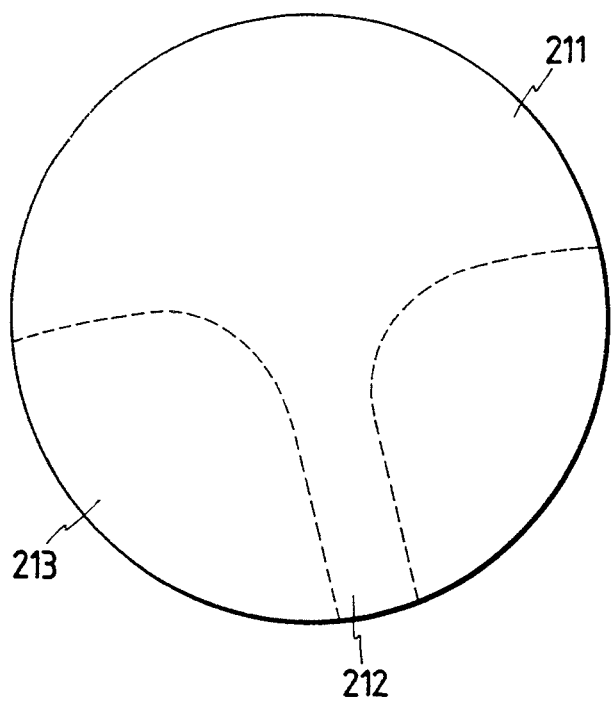
FIG. 11 shows a progressive focal length lens.
Figure 12:
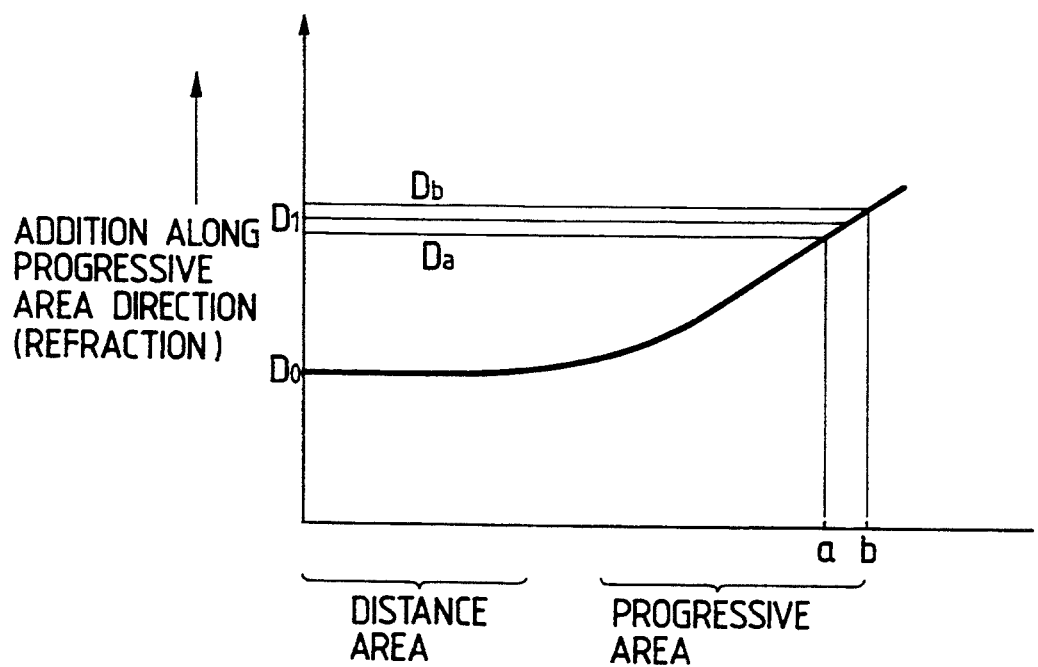
FIG. 12 illustrates the increase of a refractive power by an addition in a progressive area.

FIG. 10 shows a block diagram of the present embodiment. An optical characteristic of a lens 209 to be tested is measured by a collimator 201 including a light source having a plurality of LED's for projecting a plurality of collimated light beams to detect a horizontal refractive power to the lens 209, and an optical system 202 for directing the light beams refracted by the lens 209 to a photo-sensing unit. The detected light signal is converted to an electrical signal by a light position detector 203. The converted electrical signal is amplified and processed by a measurement circuit 204. The processed signal is applied to an arithmetic operation control unit 205 which calculates refractive power data (a sphere refractive power, a cylinder refractive power, a cylinder axis and a prism value) based on the processed signal and also calculates a progressive addition to determine the position of the progressive area. The calculated data is stored in a memory 206.

A key switch 207 is provided to direct a timing to store the data, and a display device 208 is a man-machine interface unit for displaying the progressive addition and the status of the progressive area.

The exterior of the apparatus of the present embodiment is identical to that of the previous embodiment, and FIG. 5 shows a front view thereof and FIG. 6 shows a side view thereof.

The lens is mounted on a lens table 41 and the data measured is displayed on a liquid crystal display panel. A longitudinal direction in the apparatus extends depthwise in FIG. 5 and laterally in FIG. 6.

Figure 13:
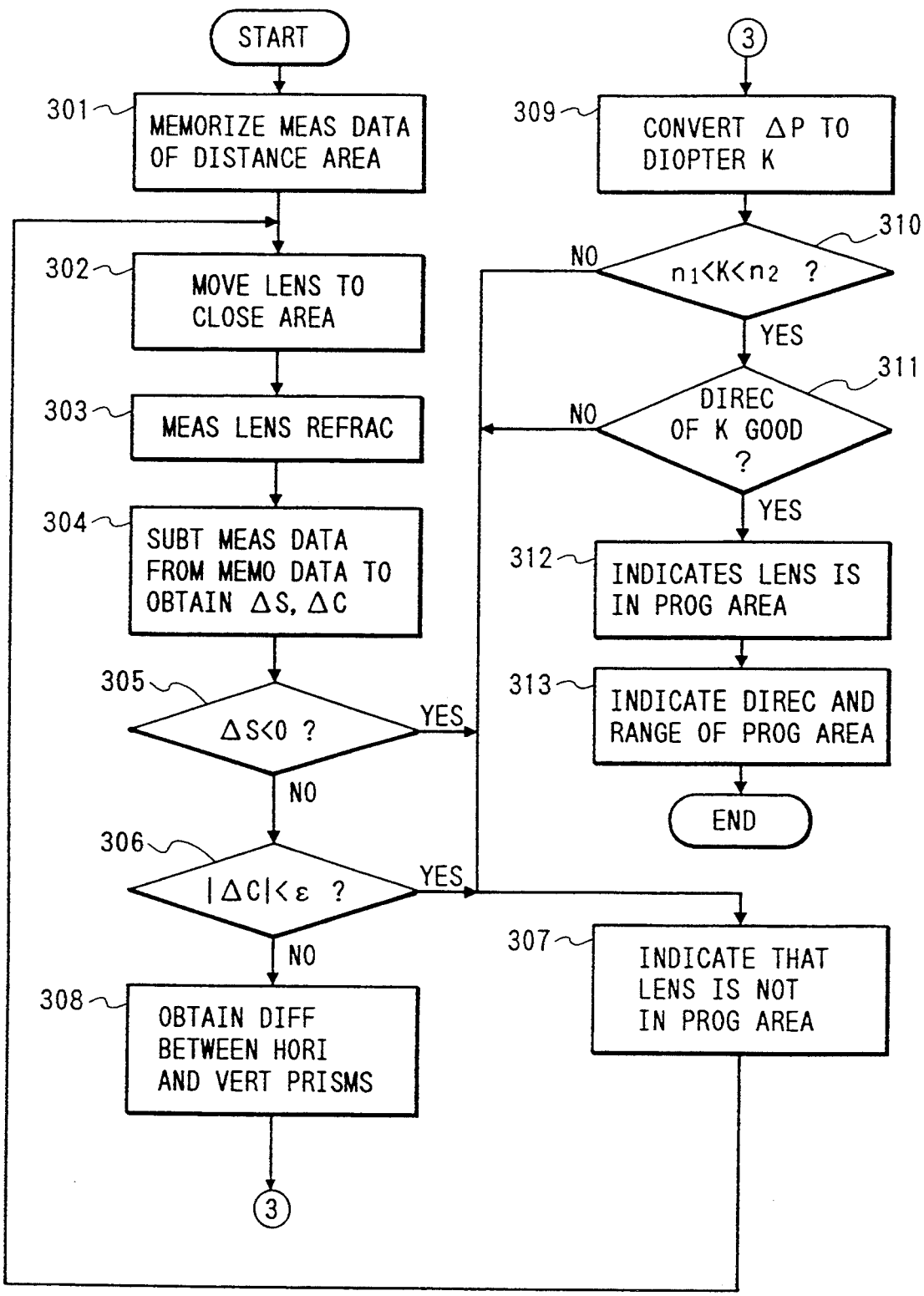
FIG. 13 shows a flow chart of an operation of the apparatus of the present invention.

An operation of the apparatus of the present embodiment is explained with reference to a flow chart of FIG. 13.

A distance area of the lens is first measured. When the lens has already been put in a frame, the distance area of the lens is a half area close to an eyebrow, and when the lens is not put in the frame, the area is indicated. Accordingly, the distance area can be readily identified. Even if there are no indicia, it is easy to determine the distance area of the lens based on the optical eccentricity of the lens, that is, the prism value. The distance area of the progressive focal length lens is mounted on the measurement table and an addition switch is depressed. At this moment, the positions of the light beams, the degree of sphere, the degree of cylinder and the cylinder axis are stored in the memory (step 301). Then, the alignment of the progressive area of the progressive focal length lens and the measurement thereof are started.

The apparatus is put in a progressive focal length lens close area measurement mode and distance area data is substracted from the measured data. In this manner, the position in the distance area can be used as an origin point for all data and the process cannot proceed while neglecting the distance area. The operator drives in the lens so that a lower half of the lens is positioned above the lens measurement table (step 302). The apparatus measures the lens (step 303) and substracts the distance area data from the raw measurement (step 304). The resulting data is expressed as follows.

Degree of sphere:$\Delta S$

Degree of cylinder:$\Delta C$

Refractive powers at two longitudinal points and two lateral points:P1–P4

The data is analyzed. As described above, the addition is present only for the positive refractive power. Thus, a condition of $$\Delta S > 0$$

is given and the decision is made (step 305). When the area does not meet it, it is a non-optical area.

Further, since the addition does not include the degree of cylinder as described above, a condition of $$\Delta C < \epsilon$$

where $\epsilon$ is a practical threshold which should be recognized as zero is given. When it is not met, the lens area is a non-optical area ( step 306 ).

If the lens area is determined as the non-optical area in the step 305 or 306, it is indicated that the lens area is not the progressive area (step 307). Thus, the lens is further driven toward the close area.

Figure 14A:
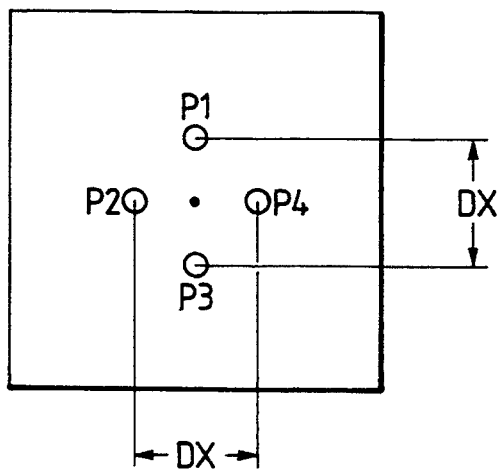
Figure 14B:
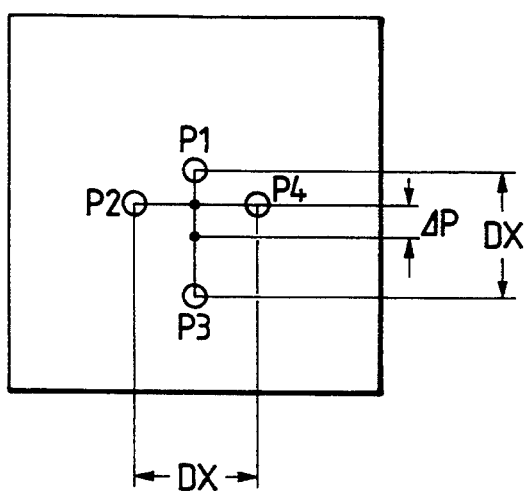

The progressive area is analyzed with reference to FIGS. 14A and 14B, in which P1–P4 are plotted on a two-dimensional plane. When the lens has no refractive power, these points are on the origin point, and when the lens has a uniform degree of sphere, that is, when the lens is not a progressive focal length lens, the four points expand in proportion to the refractive power as shown in FIG. 14A. Since the four points represent the apertures on the lens measurement table, the eccentricity of the lens is affected without regard to the position of the aperture, and the four points are moved by a distance corresponding to the prism value while they keep the positional relationship. Thus, the mid-point of P1 and P4 and the mid-point of P2 and P3 coincide and the positions represent the prism.

Assuming a lens having a longitudinal downward progression, the relationship of the four points is different from that of a conventional lens. In FIG. 14B, since P1 represents the aperture in a low refractive power area, the extension of the point is narrow. On the other hand, since P3 represents the aperture in a high refractive power area, the extension of the point is wide. As to P2 and P4, since there is no progressive effect but uniform in that direction, there is no difference from the measurement of a conventional lens and the point extensions. A difference between the mid-points (step 308) represents a difference between progression strengths. The difference $\Delta p$ has the following relationship with the progression strength.

$$\Delta P = \kappa K \times D$$

where

K: an increment of a diopter per unit distance

D: a diameter of the aperture on the lens measurement table $\kappa$: a conversion coefficient of the apparatus for a prism diopter and a lens diopter Since the direction of progression is determined by the direction of the lens, that is, the increment of the diopter has a two-dimensional directivity, $\Delta p$ is a vector amount.

Since D and $\kappa$ are constants of the apparatus per se and they are known, K is calculated based on $\Delta P$ and it is used as a decision base (step 309).

The degree K of progression is readily known from the range of the lens (for example, a maximum progression is 4Dp per 14 mm). It is compared with a maximum value and a minimum value to determine whether it is the progressive area or not. They are represented by n1 and n2. If it is not within the range, it is determined that the lens area is a non-optical area (step 310).

Since K is a vector amount, a limitation may be put on the direction of the lens so that it may be used for the decision. When the lens is driven longitudinally of the progressive area, a permissible range is set for the angle, and if the angle is sufficiently largely inclined, it is determined that the lens area is a non-optical area (step 311). The resulting information is sent to the display device to inform the operator whether the lens area is the progressive area or not (step 312). The following content is displayed on the display device to indicate the characteristic of the progressive focal length lens to the operator (step 313).

The steps 303 to 313 are repeated while the progressive area of the lens is measured and the measurement of the progressive focal length lens is obtained by processing the duplicated data.

Figure 15:
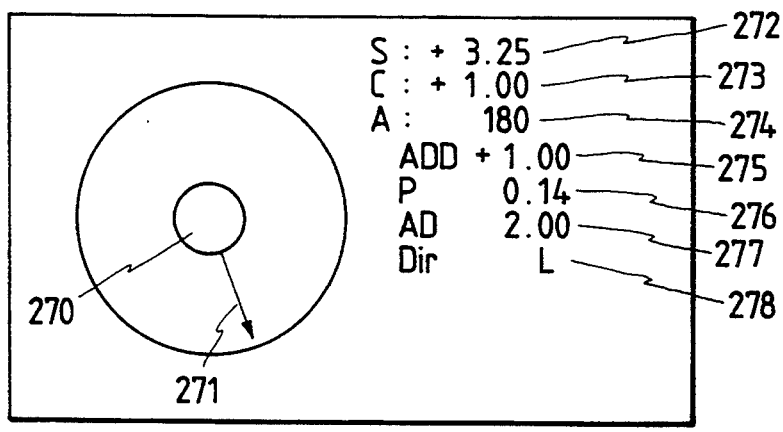
FIG. 15 shows an example of a screen display of data of the progressive focal length lens.

In FIG. 15, numeral 270 denotes an alignment display area. When the progressive area is in alignment, o is displayed, and when it is in misalignment, x is displayed so that the alignment and the misalignment are determined. Numeral 271 denotes a display to indicate the direction of progression of the progressive area. The operator can determine the direction of progression by the display 271. Numeral 272 denotes a display for the degree of sphere (S) of the distance area, numeral 273 denotes a display for the degree of cylinder (C) of the distance area, numeral 274 denotes a display for the cylinder axis (A) of the distance area, numeral 275 denotes a display for the current addition (ADD), numeral 276 denotes a display for the increment (P) of refractive power per millimeter, numeral 277 denotes a display for the virtual addition (AD) at a close area point, and numeral 278 denotes a display for the lateral direction (Dir) (left is displayed in FIG. 15) of the addition lens.

In accordance with the present invention, the measurement and the alignment of the progressive area of the progressive focal length lens, which have heretofore been difficult to attain, can be readily attained. By setting a close area point, the addition can be determined without actually driving the lens to the close area point. Further, since the progressive area of the addition lens is slightly inclined to the right or the left from the vertical line to enable the comparison of a right lens and a left lens, the discrimination of the right and left lenses, which has been impossible to attain in the prior art, can be attained.

What is claimed is:

1. An automatic lensmeter for automatically measuring a lens characteristic of a lens to be tested comprising:
- a measuring unit including an optical system for detecting a refraction characteristic of the lens;
- a calculation unit for calculating a lens characteristic value in accordance with information from said measurement unit;
- a display unit for displaying the lens characteristic value calculated by said calculation unit;
- said display unit including a screen and a target movable on the screen;
- an actual eccentricity calculation unit for calculating an actual eccentricity based on the lens characteristic value calculated by said calculation unit; and
- an optical axis position determination unit for determining whether the actual eccentricity calculated by said actual eccentricity calculation unit is within a predetermined range or not to determine whether measurement and/or marking are permitted;
- said display unit displaying the determination of said optical axis position determination unit,
- said display unit having a display control unit for converting the actual eccentricity calculated by said actual eccentricity calculation unit to a corresponding quantity on the screen of said display unit to move the target to a position deviated from a reference position by the actual eccentricity,
- wherein said display unit displays dot by dot on the screen, the size of one dot on the screen is 0.3 mm and the conversion is effected by the following formulas:

$$NX = 0.3X$$

$$NY = 0.3Y$$

where
NX: an X coordinate on the display screen
NY: a Y coordinate on the display screen.

2. A progressive focal length lens lensmeter comprising:
- a collimator including a light source for projecting a plurality of collimated light beams to a lens to be tested;
- an optical system for directing the light beams refracted by passing through the lens to a photosensing system;
- photo-detection means for converting a light signal from said optical system to an electrical signal;
- control means for determining refractive power data based on the output of said photo-detection means and determining a progressive addition and a position of a progressive area; and
- display means for displaying the data of said control means,
- wherein said control means determines the progressive addition of the lens by the following formulas:

$$\Delta P = \kappa K \times D$$

where
$\Delta P$: a vector
K: an increment of diopter per unit distance
D: a diameter of an aperture on a lens measurement table
$\kappa$: conversion coefficient.

3. An automatic lensmeter for automatically measuring a lens characteristic of a lens to be tested, comprising:
- a measuring unit including an optical system for detecting a refraction characteristic of the lens;
- a determining unit inputting information from said measuring unit for determining a lens characteristic value;
- a display unit for displaying the lens characteristic value determined at said determining unit;
- actual eccentricity determining means for determining an actual eccentricity on the basis of the lens characteristic value determined at said determining unit and a condition for determining the actual eccentricity; and
- optical axis position judging means for judging whether or not the actual eccentricity determined at said actual eccentricity determining means is within a predetermined range and for determining whether or not a measurement and/or a marking are permitted, said display means displaying the result of the judgement; wherein said actual eccentricity determining means determines the eccentricity in accordance with the following equations when $S(S+C) < \zeta_0$ is not satisfied:

$$X = 10(PX(S+C(1-\cos(2AX))/2 - PY\sin(2AX))/(S(S+C))$$

$$Y = 10(PY(S+C(1+\cos(2AX))/2 - PX\sin(2AX))/(S(S+C))$$

where
S: a degree of sphere of the lens to be tested;
C: a degree of cylinder of the lens to be tested;
$\zeta_0$: a predetermined value;
PX: a horizontal prism value of the lens;
PY: a vertical prism value of the lens;
AX: an angle.

4. An automatic lensmeter according to claim 3, wherein said optical axis position judging means judges that a marking can be made onto the lens to be tested in accordance with the following equation:

$$SQR(X^2 + Y^2) < \zeta_0$$

where
$\eta_0$: a predetermined value.

5. An automatic lensmeter for automatically measuring a lens characteristic of a lens to be tested, comprising:
- a measuring unit including an optical system for detecting a refraction characteristic of the lens;
- a determining unit inputting information from said measuring unit for determining a lens characteristic value;
- a display unit for displaying the lens characteristic value determined at said determining unit;
- actual eccentricity determining means for determining an actual eccentricity on the basis of the lens characteristic value determined at said determining unit and a condition for determining the actual eccentricity; and
- optical axis position judging means for judging whether or not the actual eccentricity determined at said actual eccentricity determining means is within a predetermined range and for determining whether or not a measurement and/or a marking are permitted, said display means displaying the result of the judgement;

wherein said optical axis position judging means judges that a measurement can be made on the lens to be tested in accordance with the following equation when $S(S+C)<\zeta_0$ is satisfied:

$$SQR(PX^2+PY^2)>\epsilon_1$$

where $$\epsilon_1=\zeta_1\eta_0/10$$

$\eta_0$: a permissive deviation when the refractive power is $\zeta_1$.

* * * * *